United States Patent
Vakilian et al.

(10) Patent No.: US 11,061,596 B2
(45) Date of Patent: Jul. 13, 2021

(54) MULTI-PASS DISTRIBUTED DATA SHUFFLE

(71) Applicant: Google LLC, Mountain View, CA (US)

(72) Inventors: Mohsen Vakilian, Kirkland, WA (US); Hossein Ahmadi, Seattle, WA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 16/672,939

(22) Filed: Nov. 4, 2019

(65) Prior Publication Data

US 2021/0132841 A1 May 6, 2021

(51) Int. Cl.
*G06F 3/06* (2006.01)
*G06F 12/02* (2006.01)
*G06F 12/0804* (2016.01)

(52) U.S. Cl.
CPC .......... *G06F 3/0644* (2013.01); *G06F 3/067* (2013.01); *G06F 3/0611* (2013.01); *G06F 12/0223* (2013.01); *G06F 12/0804* (2013.01)

(58) Field of Classification Search
CPC ...... G06F 3/0644; G06F 3/0611; G06F 3/067; G06F 12/0223; G06F 12/0804; H04L 29/08072; H04L 29/06; H04L 29/0809; H04L 29/080721
See application file for complete search history.

(56) References Cited

U.S. PATENT DOCUMENTS

| | | | |
|---|---|---|---|
| 9,952,798 B2 | 4/2018 | Ahmadi et al. | |
| 10,073,648 B2 | 9/2018 | Ahmadi et al. | |
| 10,223,450 B1 | 3/2019 | Armstrong et al. | |
| 2016/0283282 A1* | 9/2016 | Hu | G06F 9/5072 |
| 2018/0196618 A1 | 7/2018 | Ahmadi et al. | |

OTHER PUBLICATIONS

A. Awang, "Multi-sink routing using path loss in multihop wireless sensor networks," The 17th Asia Pacific Conference on Communications, Sabah, Malaysia, 2011, pp. 139-144, doi: 10.1109/APCC.2011.6152793. (Year: 2011).*
International Search Report and Written Opinion for International Application No. PCT/US2020/058637 dated Mar. 5, 2021. 13 pages.

* cited by examiner

*Primary Examiner* — Khoa D Doan

(74) *Attorney, Agent, or Firm* — Lerner, David, Littenberg, Krumholz & Mentlik, LLP

(57) ABSTRACT

A system and method for repartitioning data in a distributed network. The method may include executing, by one or more processors, a first pass of a data set from a plurality of first sources to a plurality of first sinks, each first sink collecting data from one or more of the first sources, and executing, by the one or more processors, a second pass of the data set from a plurality of second sources to a plurality of second sinks, each one of the plurality of first sinks corresponding to one of the plurality of second sources, and each second sink collecting data from one or more of the second sources. Executing the first and second passes causes the data set to be repartitioned such that one or more second sinks collect data that originated from two or more of the first sources.

20 Claims, 10 Drawing Sheets

PRIOR ART

MULTI-PASS DISTRIBUTED DATA SHUFFLE

BACKGROUND

The technology of the present disclosure relates generally to a system for improving the efficiency of shuffle operations involving many sinks. In a "shuffle," blocks of data from multiple sources are redistributed among multiple sinks using a distribution scheme that causes blocks of data in each source to be distributed to multiple sinks. At the end of a shuffle each sink may include blocks from more than one source.

Shuffle data is conventionally organized by its source and mapped to its corresponding source for each sink. FIG. 1 is a functional block diagram showing an example of a shuffle operation in which blocks of data stored at sources 10 are shuffled to sinks 30. In the example of FIG. 1 there are fourteen sources and sixteen sinks. Each sink is mapped to, and receives, data from four different sources. For example, each of sinks 31 and 32 is mapped to receive shuffled data from sources 11, 12, 13 and 14. For further example, each of sinks 33 and 34 is mapped to and receives shuffled data that is mapped from sources 11 and 12 to source 13, from source 13 to source 15, and from source 15 to sinks 33 and 34. There are 64 total mappings between sink and source for the shuffle of FIG. 1—four sources for each of the sixteen sinks.

Conventionally, shuffle operations may require each source to append its data to a common log. Therefore, shuffle operations can easily scale to accommodate additional sources, and the number of operations to complete a shuffle may increase linearly as the number of sources increases. However, since the sinks receive data from multiple sources and thus are mapped to several different sources, each sink must scan all of the sources from which it may receive data. Thus shuffle operations do not scale as easily to accommodate additional sinks, as the number of operations to complete a shuffle may increase quadratically as the number of sinks increases. As the amount of data handled in the shuffle operation increases, the data may no longer fit in a limited number of sinks, so it becomes necessary to increase the number of sinks to which the data is repartitioned.

BRIEF SUMMARY

One aspect of the present disclosure is directed to a method of repartitioning data in a distributed network. The method may include executing, by one or more processors, a first pass of a data set from a plurality of first sources to a plurality of first sinks, each first sink collecting data from one or more of the first sources, and executing, by the one or more processors, a second pass of the data set from a plurality of second sources to a plurality of second sinks, each one of the plurality of first sinks corresponding to one of the plurality of second sources, and each second sink collecting data from one or more of the second sources. Executing the first and second passes may cause the data set to be repartitioned such that one or more second sinks collect data that originated from two or more of the first sources.

In some examples, a quantity of the plurality of first sinks may be greater than a quantity of the plurality of first sources.

In some examples, each first sink may collect data from two or more of the first sources.

In some examples, a quantity of the plurality of second sinks may be greater than a quantity of the plurality of second sources.

In some examples, the method may further include executing N passes, N being a number having a value greater than two. For each given pass, a plurality of sinks may collect data from one or more of a plurality of sources, each source corresponding to a sink of a previous pass. Executing the N passes may cause the data set to be repartitioned such that one or more Nth sinks collect data that originated from two or more of the first sources.

In some examples, for at least one pass of the N passes, each sink of the pass may collect data from two or more of the sources of the pass, and each of the two or more sources of the pass may include data that originated from different sources of an immediately preceding pass.

In some examples, for at least another pass of the N passes, each sink of the pass may collect data from two or more of the sources of the pass, and each of the two or more sources of the pass may include data that originated from different sources of an immediately preceding pass.

In some examples, the at least one pass and the at least another pass may be consecutive passes of the N passes.

In some examples, each of the plurality of first sinks may be a corresponding one of the plurality of second sources. The method may further include determining completion of the first pass and initiating the second pass upon determining that first pass is completed.

In some examples, each of the plurality of first sinks may be a corresponding one of the plurality of second sources, and the method may further include, prior to the first pass, designating each of the plurality of first sinks and the plurality of second sinks, whereby designation of the plurality of second sinks avoids data from the plurality of first sources being collected at the plurality of second sinks during the first pass, and upon at least one first sink completing collection from one or more of the first sources, and before completion of the first pass, designating one or more second sinks to collect from the at least one first sink.

In some examples, the data set may be passed from the plurality of first sources to the plurality of first sinks using a first hash function, and from the plurality of second sources to the plurality of second sinks using a second hash function that may be correlated to the first hash function In some examples, identifications of the plurality of second sinks may be contiguous, and for each second sink, the method may include calculating a range of identifications of the second sources from which the second sink collects based on the identification of the second sink.

In some examples, the method may further include flushing, by one or more processors, a shuffle log of the first pass, and before completion of the flushing, executing the second pass for segments of the data set that have been flushed from the shuffle log of the first pass.

In some examples, executing the second pass may include executing a plurality of shuffle operations. A first portion of the second sources may be included in a first data log, and a second portion of the second sources may be included in the second data log.

In some examples, each of the plurality of shuffles may be executed in parallel by the one or more processors, and data included in both the first and second data logs may be flushed from the first and second portions of the second sources in parallel.

Another aspect of the present disclosure is directed to a system for repartitioning data in a distributed network, including one or more processors and one or more storage devices in communication with the one or more processors. The one or more storage devices may contain instructions configured to cause the one or more processors to execute a first pass of a data set from a plurality of first sources to a plurality of first sinks, each first sink collecting data from one or more of the first sources, and to execute a second pass of the data set from a plurality of second sources to a plurality of second sinks, each one of the plurality of first sinks corresponding to one of the plurality of second sources, and each second sink collecting data from one or more of the second sources. The first and second passes may cause the data set to be repartitioned such that one or more second sinks collect data that originated from two or more of the first sources.

In some examples, each first sink may collect data from two or more of the first sources, and a quantity of the plurality of second sinks may be greater than a quantity of the plurality of second sources.

In some examples, the instructions may be configured to cause the one or more processors to execute N passes, N being a number having a value greater than two. For each given pass, a plurality of sinks may collect data from one or more of a plurality of sources, each source corresponding to a sink of a previous pass. Executing the N passes may cause the data set to be repartitioned such that one or more Nth sinks collect data that originated from two or more of the first sources.

In some examples, for at least one pass of the N passes, each sink of the pass may collect data from two or more of the sources of the pass, and each of the two or more sources of the pass includes data that originated from different sources of an immediately preceding pass. For at least one other pass of the N passes, each sink of the pass may collect data from two or more of the sources of the other pass, and each of the two or more sources of the other pass may include data that originated from different sources of an immediately preceding pass. The at least one pass and the at least one other pass may be consecutive passes of the N passes.

DETAILED DESCRIPTION

Overview

Figure 1:
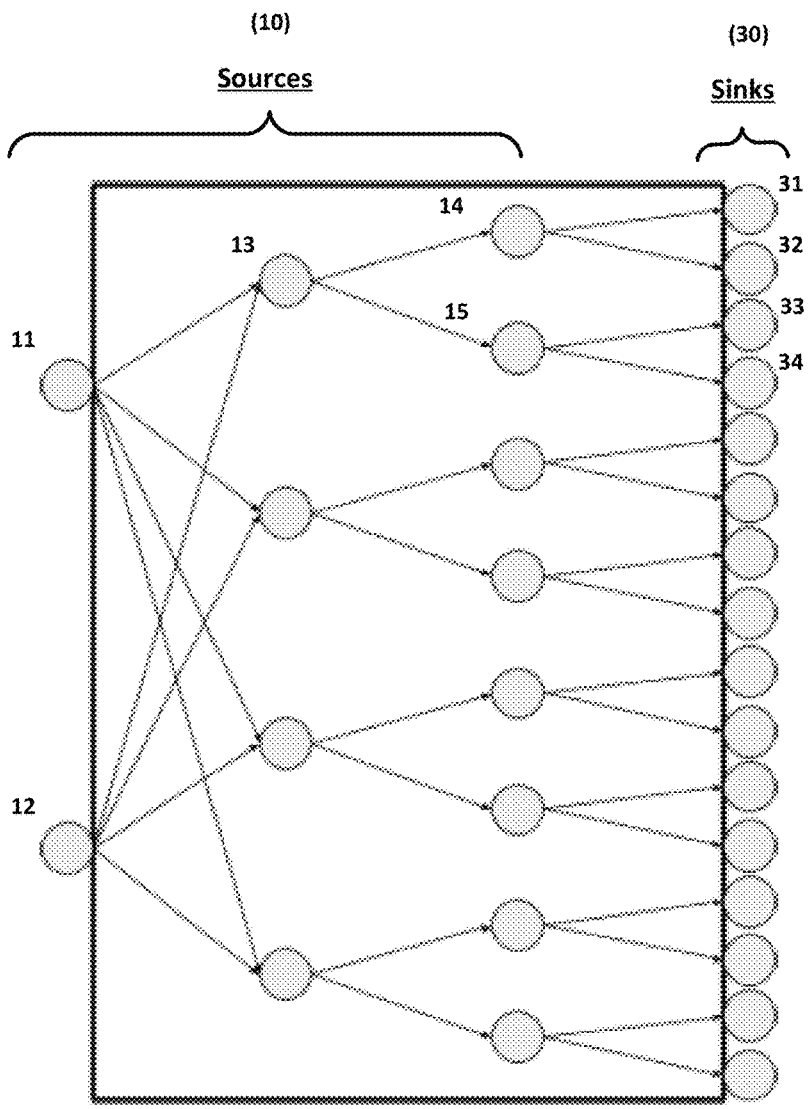
FIG. 1 is a block diagram illustrating an example prior data distribution scheme.

In order to scale the shuffle operations with the increasing number of sinks, the present disclosure divides the shuffle operations into multiple passes. In this manner, the number of sources that are read by each sink is reduced, thus alleviating the amount of overhead of the shuffle operations for each sink. Multi-pass shuffle operations can be implemented in different ways and each implementation may improve efficiency in a different manner.

In some implementations, at least one pass of a multi-pass shuffle may be a "sink split." In a sink split data from each given source is distributed among multiple sinks, but each sink reads data from only one source. Sink splitting in one pass of the multi-pass shuffle may allow the other passes of the multi-pass shuffle to be executed using fewer sinks.

For example, if it is desired to distribute data from 100,000 sources to 100,000 sinks, the data may first be passed to 1,000 sinks, and then the data of each of the 1,000 sinks may be separately split among 100 sinks, resulting in a total of 100,000 sinks after the split. In the first pass, each of the 1,000 sinks may read data from a certain number of sources. Since this pass is a shuffle and each sink reads data from multiple sources, reducing the number of sinks in this pass by a factor of 100 significantly reduces the overhead of the pass. In the subsequent split, each sink reads from only a single source, which also requires significantly less overhead. As a result, the number of sources read by the sinks is reduced in both passes.

Additionally or alternatively, a split may be performed as the first pass of the multi-pass shuffle. Splitting data early may be preferable if the shuffle includes data from a lot of sources. For instance, if there are 1,000,000 sources to be distributed to 2,000,000 sinks, then data from the 1,000,000 sources may first be split into 2 sinks each. Then the resulting 2,000,000 sinks may be separated into 2,000 groups, each group taking data from 1,000 different sources and shuffling the data to 1,000 sinks. The sinks of the first shuffle may be regrouped and then shuffled in a similar manner, resulting in each original source being relatively thoroughly distributed. This form of grouping and reshuffling is referred to herein as a "butterfly shuffle." As with the prior example, the overhead in each pass is significantly reduced. The overhead of the first pass of the butterfly shuffle is reduced because it is a split, whereby sinks read from only one source. Overhead in the subsequent passes is reduced because each individual shuffle between 1,000 sources and 1,000 sinks requires quadratically less overhead than a shuffle between 1,000,000 sources and 1,000,000 sinks. Stated another way, although the total number of shuffles performed in each pass increases linearly, the processing for each shuffle compared to a single 1,000,000-to-1,000,000 shuffle decreases quadratically.

In the above example of the butterfly shuffle, the number of independent shuffles executed from one pass to the next remains constant. In other example multi-pass shuffles, the number of shuffles executed from one pass to the next can multiply. For example, an initial pass that shuffles data from 10,000 sources to 20,000 sinks may be followed a second pass having two independent shuffles of 10,000 sources to 20,000 sinks. The result of the second pass would distribute the data among 40,000 sinks. Each independent shuffle of the second pass may have its own log of metadata for the blocks of data that are shuffled. This may be preferable for increasing the number of sinks handled by the overall shuffle operation since each log contains metadata for only those sinks that read the blocks of the individual shuffle, and not all of the blocks of the entire pass.

The use of a multi-pass shuffle may improve efficiency of the flushing operations if there is a need to flush metadata from longs during a shuffle. This is because the second pass of the multi-pass shuffle can be controlled to distribute only the data that has already been flushed from the first shuffle. Furthermore, in some cases, the use of multiple passes to complete a shuffle may altogether avoid the need for flushing metadata from the logs, since reducing the total number of sink destinations for a given segment also reduces the total amount of metadata stored for the segment.

In some cases, a multi-pass shuffle may be implemented as a single shuffle by deferring partitioning of the sinks of the subsequent passes until a later time. For instance, in the example of shuffling data from 100,000 sources to 100,000 sinks by using 1,000 of the sinks in a first pass, the partitioning of the remaining 99,000 sinks may be deferred. This prevents the 100,000 sources from writing directly to those 99,000 sinks. In one case, the 99,000 sinks may be blocked until the entire first pass is completed. In another case, the next pass may begin before the first pass ends, but the partitioning scheme of the sinks of the next pass may be changed to prevent the sources from writing directly to them.

The above implementations can improve shuffle performance, and particularly when scaled beyond tens of thousands of sinks. For example, test results have shown that the speed of shuffling approximately 2TiB of data from 100,000 sources to 100,000 sinks can be more than doubled by performing a first pass to 1,000 sinks and a second splitting pass to the 100,000 sinks. This results in a significant reduction in resources, cost and time required to perform the shuffle.

Example Systems

Figure 2A:
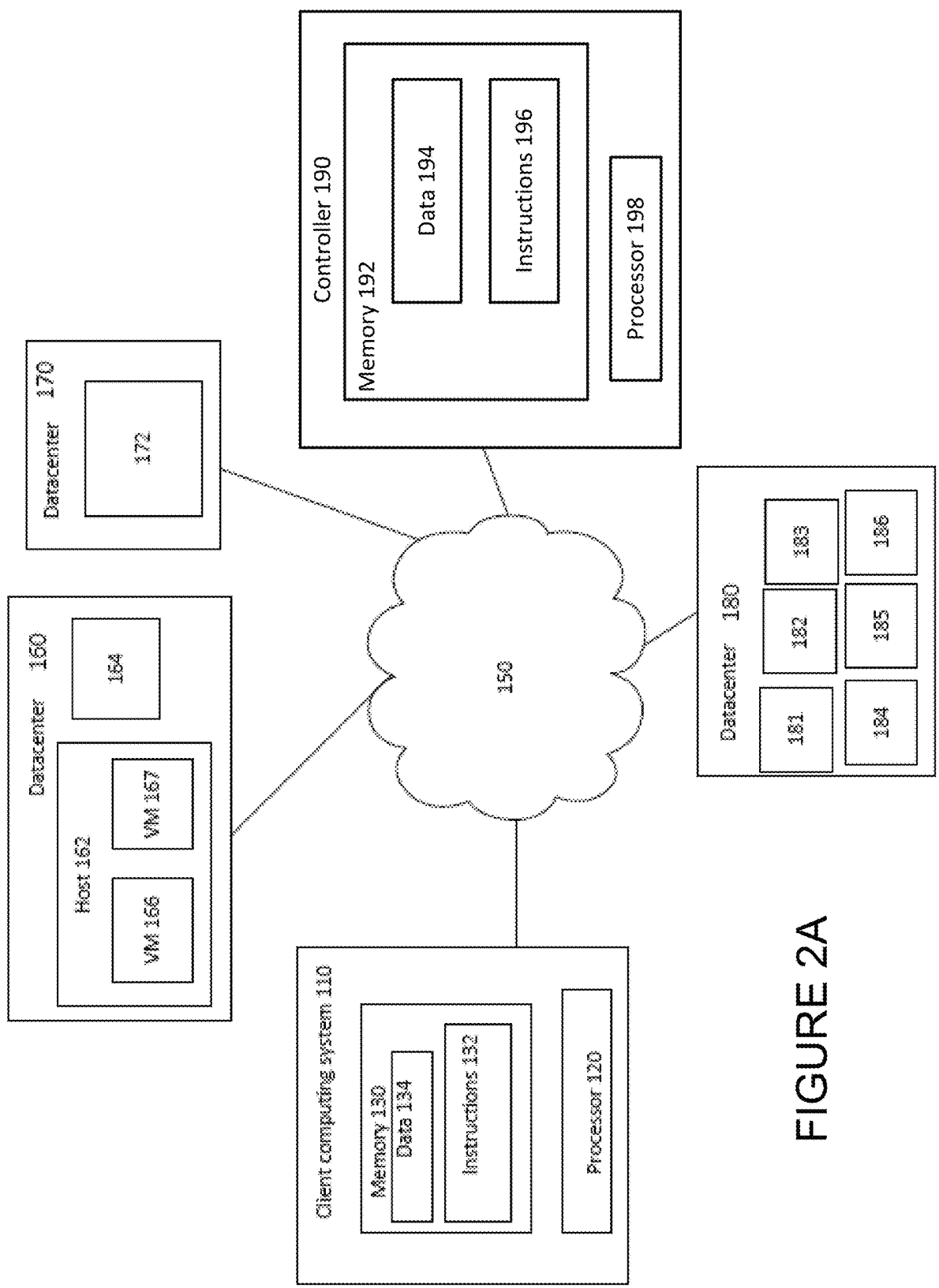
FIG. 2A is a block diagram of an example system within a distributed data store according to aspects of the disclosure.

FIG. 2A illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 2A functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 2A, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 2A, it should be understood that any number of virtual machines may be supported by any number of host computing devices. Moreover, it should be understood that the configuration illustrated in FIG. 2A is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The datacenters 160-180 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. The controller 190 may be configured to redistribute or repartition data stored among the computing devices in the datacenters 160-180.

Client 110, datacenters 160-180, and controller 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Client 110 may request access to data stored in the computing devices of the data centers 160-180. Such request may be handled by the controller 190 and/or one or more of the computing devices in datacenters 160-180. In some examples, a response to a request may involve or otherwise require manipulation of the data, such as using the operations described in greater detail herein.

Figure 2B:
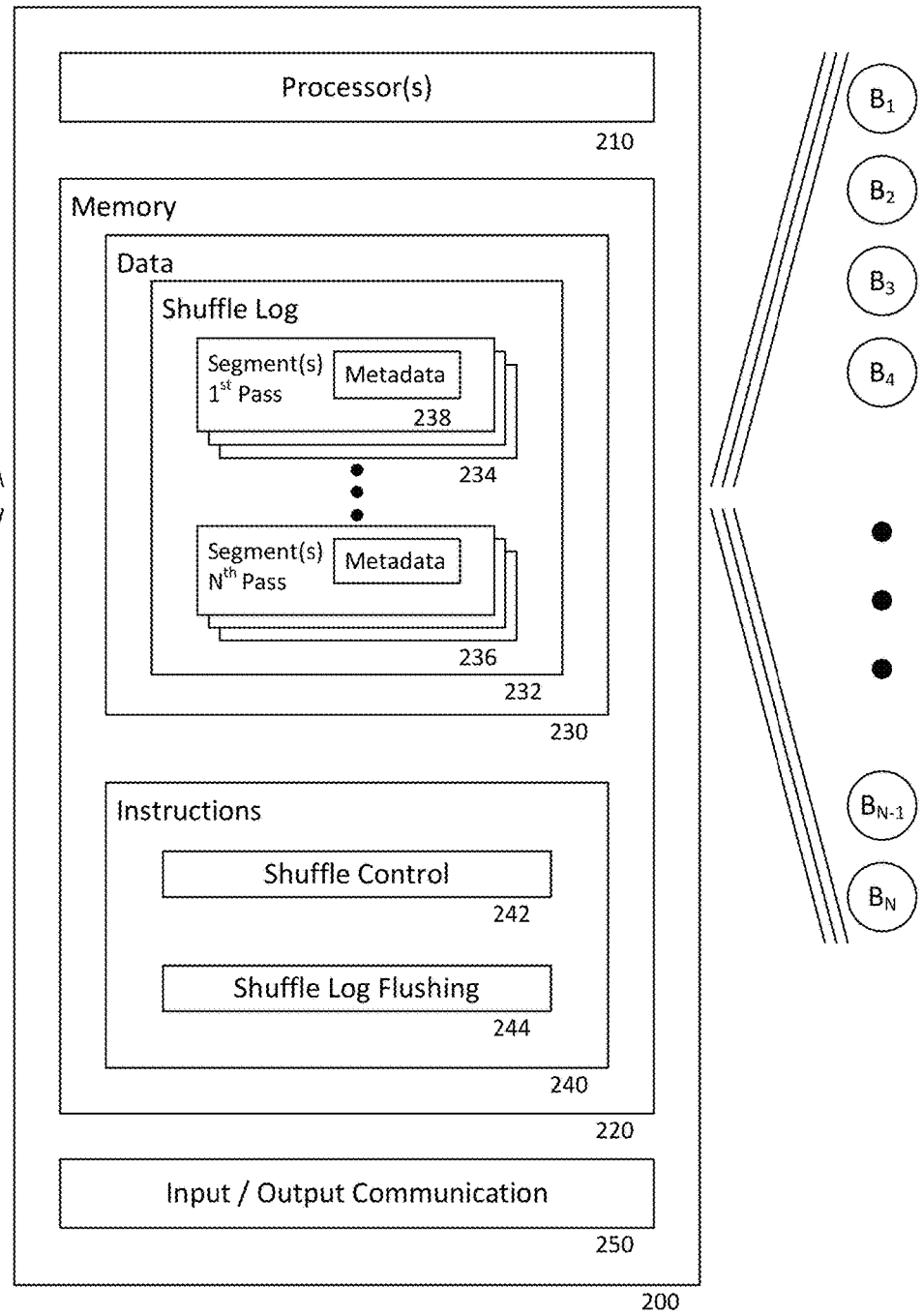
FIG. 2B is a block diagram of an example system and computing device according to aspects of the disclosure.

FIG. 2B is a block diagram illustrating an example system having one or more computing devices 200 for performing a shuffle operation in accordance with the present disclosure. The computing devices 200 may be included in a distributed data processing system, such as a computing device of one of datacenters 160-180, or a controller 190, as shown in FIG. 2A. The computing devices 200 may be configured to run complex queries on large volumes of data, such as "JOIN" and "GROUP BY" operations, by repartitioning the data. Such operations may be performed in response to queries. In some examples, the queries may be received by a client computing device. In some examples, the queries may be necessitated in order to carry out other instructions or queries received from client computing devices.

Data in the distributed data processing system may be stored transiently, such as in a distributed in-memory file system, or disk, or by any combination of the two. Data may be shuffled from a number of data sources $A_1$-$A_N$ to a number of data sinks $B_1$-$B_N$. The sources and sinks may be assigned virtual addresses for purposes of tracking the data during repartitioning. In some examples, the data may be stored in virtual machines, such as the virtual machines 166-167 hosted by the data centers 160-180 of FIG. 2A.

The computing devices 200 may include one or more processors 210, servers, shards, cells, or the like. It should be understood that each computing device may include any number of processors or computing devices, that the number of such devices in the computing devices may vary over time, for example, as hardware is removed, replaced, upgraded, or expanded.

The computing devices 200 may also include a number of storage devices or memory 220, such as hard drives, random access memory, disks, disk arrays, tape drives, or any other types of storage devices. The computing devices 200 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The computing device 200 may include a number of other devices in addition to the storage devices, such as communication devices 250 to enable input and output between the computing devices, such as cabling, routers, etc.

Memory 220 of each of the computing devices can store information accessible by the one or more processors 210, including data 230 that is received at or generated by the computing devices 200, and instructions 240 that can be executed by the one or more processors 210.

The data 230 may include a shuffle log 232 tracking shuffle operations between the sources $A_1$-$A_N$ and sinks $B_1$-$B_N$ of the system. The shuffle log 232 may include details of the data segments 234, 236 being shuffled in the shuffle operations, such as metadata of the individual data segments 238. Conceptually, the shuffle data may be representation as mappings between sources and their respective destination sinks.

As discussed in greater detail below, the shuffle operations may be divided into multiple passes, from a first pass to an $N^{th}$ pass. As such, the data segment details are shown in the example shuffle log 232 of FIG. 2B as being stored separately. Separate tracking of the details for each pass may help to manage storage of the data segment details 234, 236 and metadata 238. For instance, details of the first pass 234 may be flushed from the memory 220 once the first pass has been completed and the data has been stored in a log file of its destination sink, even if subsequent passes are ongoing. In other instances, there may be overlap between the shuffle log 232 and the data logs of the sinks.

The instructions 240 may include a shuffle control program 242 configured to control operations of a data shuffle. The instructions 240 may further include a shuffle log flushing program 244 configured to manage storage of the data segment details 234, 236 and metadata 238 of the shuffle log 232. The above examples of stored data and programs are discussed in greater detail below.

Example Methods

Figure 3:
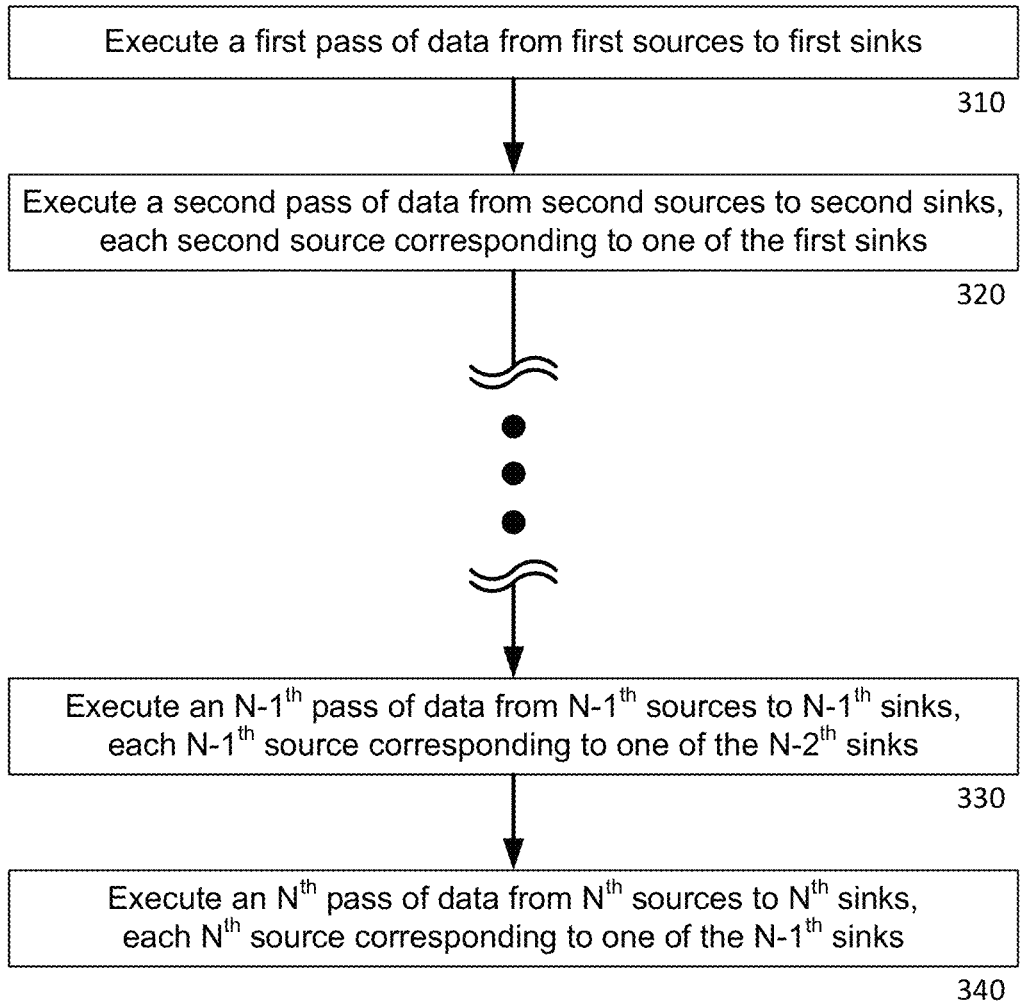
FIG. 3 is a flow diagram representing an example multi-pass shuffle according to aspects of the disclosure.

FIG. 3 is a flow diagram 300 illustrating an example multi-pass shuffle that shuffles data from a number of sources to a number of sinks. The operations in the flow diagram may be carried out by processors of the computing devices 200, such as the one or more processors 210 of FIG. 2B in communication with the storage locations of the shuffled data, such as sources $A_1$-$A_N$ and sinks $B_1$-$B_N$.

At block 310, a first pass of data may be executed. The first pass may involve moving data from a set of first sources to a set of first sinks. Then, at block 320, a second pass of data may be executed. The second pass may involve moving data from a set of second sources, which may correspond to the set of first sinks, to a set of second sinks.

Figure 4:
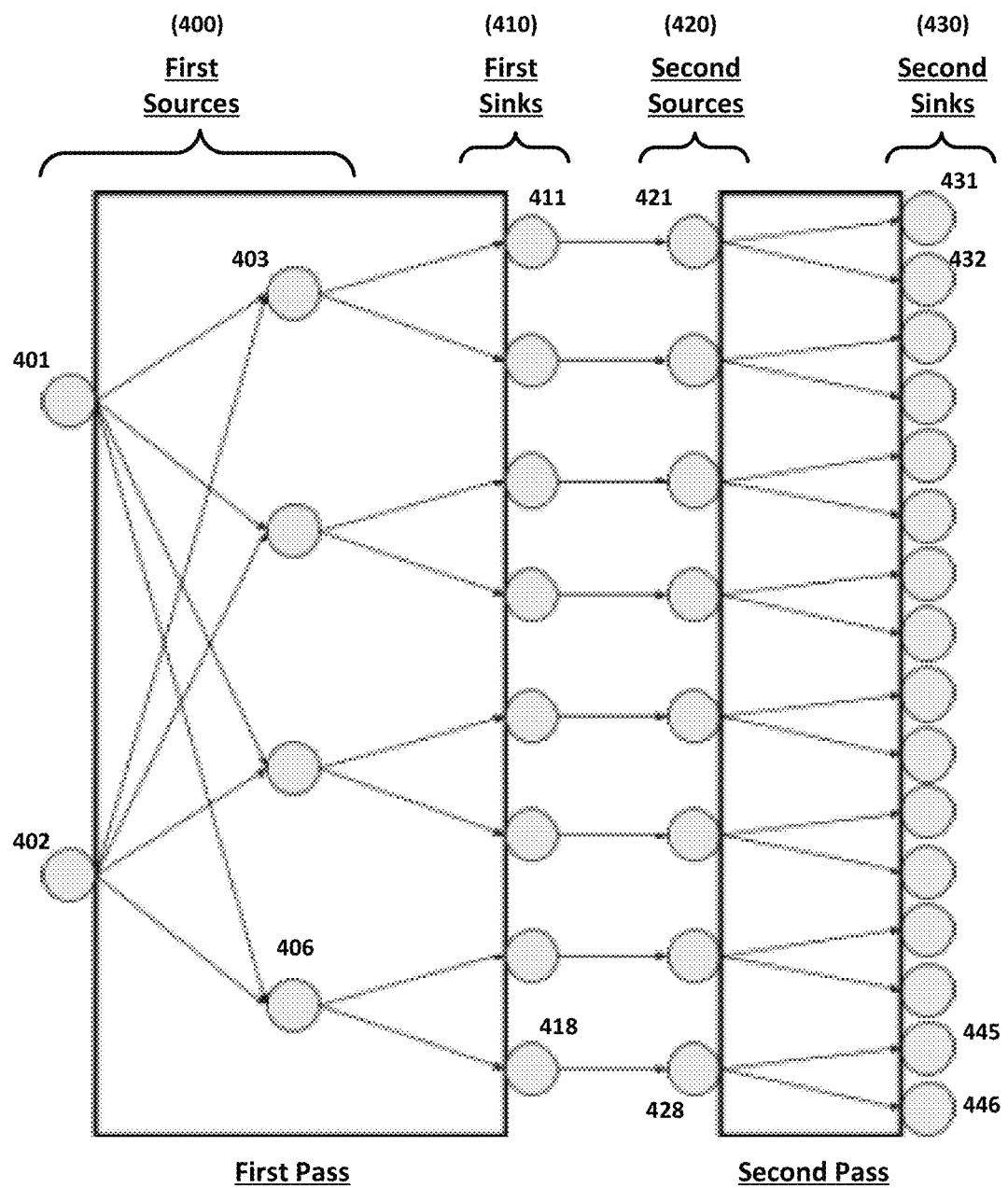
FIGS. 4-7 are block diagrams illustrating example data distribution schemes according to aspects of the disclosure.

For example, FIG. 4 shows an example of a data distribution scheme and setup in which data is shuffled using a shuffle operation in a series of two passes. The shuffle operation is divided into two separate passes: a first pass from first sources 400 to first sinks 410, and a second pass from second sources 420, which correspond to the first sinks 410, to second sinks 430. In the first pass, each of the first sinks 410 receives segments of data from three different ones of the first sources 400. For instance, sink 411 receives data from each of sources 401, 402 and 403. In another example, sink 418 receives data from each of sources 401, 402 and 406. Since each of the sinks are mapped to the sources from which they receive data, there are 24 total mappings between first sinks and first sources for the first pass of the shuffle of FIG. 4—three mappings for each of the eight sinks. In the second pass, each of the second sinks 430 receives data from one of the second sources 420, which may correspond to the second sinks 410. For instance, each of sinks 431 and 432 receives data from source 421. For instance, each of sinks 445 and 446 receives data from source 418. Since each of the sinks are mapped to only the source from which it receives data, there are only 16 total mappings between second sinks and second sources for the second pass of the shuffle of FIG. 4—one mapping for each of the sixteen sinks. Altogether the total number of mappings that are tracked during the course of the two-pass shuffle is 40—the 24 mappings of the first pass, and the 16 mappings of the second pass—which is less than the 64 total mappings of the same shuffle when executed as a single pass.

As the number of sources and sinks involved in the shuffle operations increases, the benefits of performing multiple passes also increases. For example, to distribute data from 100,000 sources to 100,000 sinks in a single pass, each sink could be required to read data from numerous sources, for example, 10,000 sources. This would require a total of 10,000*100,000=1 billion mappings between sources and sinks. Even if each sink were to read from only 1,000 sources, 100 million mappings would still need to be tracked. Introducing a second pass would allow the data to first be passed to a small initial subset of sink, such as 1,000 sinks from the sources, and then the data of each of the 1,000 sinks may be separately split among 100 sinks. In the first pass, if each of the 1,000 sinks reads data from either 10,000 or 1,000 of the 100,000 sources, the total number of mappings would amount to 10 million or 1 million, respectively. In the second pass, each of the 100,000 sinks would be mapped to a single source, adding up to a total of 100,000 mappings. Thus, the total number of mappings tracked in the two-pass shuffle would amount to 10.1 million mappings when using 10,000 intermediate sinks, or 1.1 million when using 1,000 intermediate sinks. This number of mappings is significantly less than the 1 billion or 100 million mappings of the single-pass scenario. Experiments suggest that a shuffle operation using 1,000 intermediate sinks to shuffle about 2 TiB of data may be at least twice as fast as the same operation performed without any intermediate sinks.

The above example of FIG. 4 illustrates one such two-pass shuffle in which the second pass is referred to as a "sink split." In a sink split, data from each given source is distributed among multiple sinks, but each sink reads data from only one source. Sink splitting in one pass of the multi-pass shuffle may allow the other, previous passes of the multi-pass shuffle to be executed using fewer sinks. As can be seen from the above example scenarios, the introduction of a sink split as a subsequent pass of the shuffle operation can significantly reduce overhead in the previous passes, since there are far fewer intermediate sinks that need to be mapped to and read data from multiple sources. The introduction of a sink split can also significantly reduce overhead in the final pass, since each of the final sinks is mapped to and reads data from only one source.

In the above example, sinks of one pass are described as "corresponding" to sources of a next pass. The correspondence may be that the sinks of the one pass are the same as the sources of the next pass, meaning that their addresses are the same. Alternatively, the address of the sink may be different than the address of the source of the next pass, but all data of the sink may be moved to the address of the corresponding source of the next pass.

A multi-pass shuffle may include further operations, such as a third pass, fourth pass, and so on. In the example multi-pass shuffle of FIG. 3, passes are shown to be executed up until an $N^{th}$ pass. In particular, at block 330, an $N-1^{th}$ pass of the data may be executed. The $N-1^{th}$ pass may involve moving the data from a set of $N-1^{th}$ sources, which may correspond to the set of $N-2^{th}$ sinks, to a set of $N-1^{th}$ sinks. Further, at block 340, an $N^{th}$ and final pass of the data may be executed. The $N^{th}$ pass may involve moving the data from a set of $N^{th}$ sources, which may correspond to the set of $N-1^{th}$ sinks, to a set of $N^{th}$ sinks.

The value of N may vary depending on the amount of data to be shuffled, the purpose of the shuffle operation, and the particular types of shuffle operations being executed. For example, in the case of the sink split shown in the example of FIG. 4, it may suffice to have a relatively small number of passes, such as two passes. In other types of shuffle operations it may be beneficial to divide the operation into three or more passes.

Figure 5:
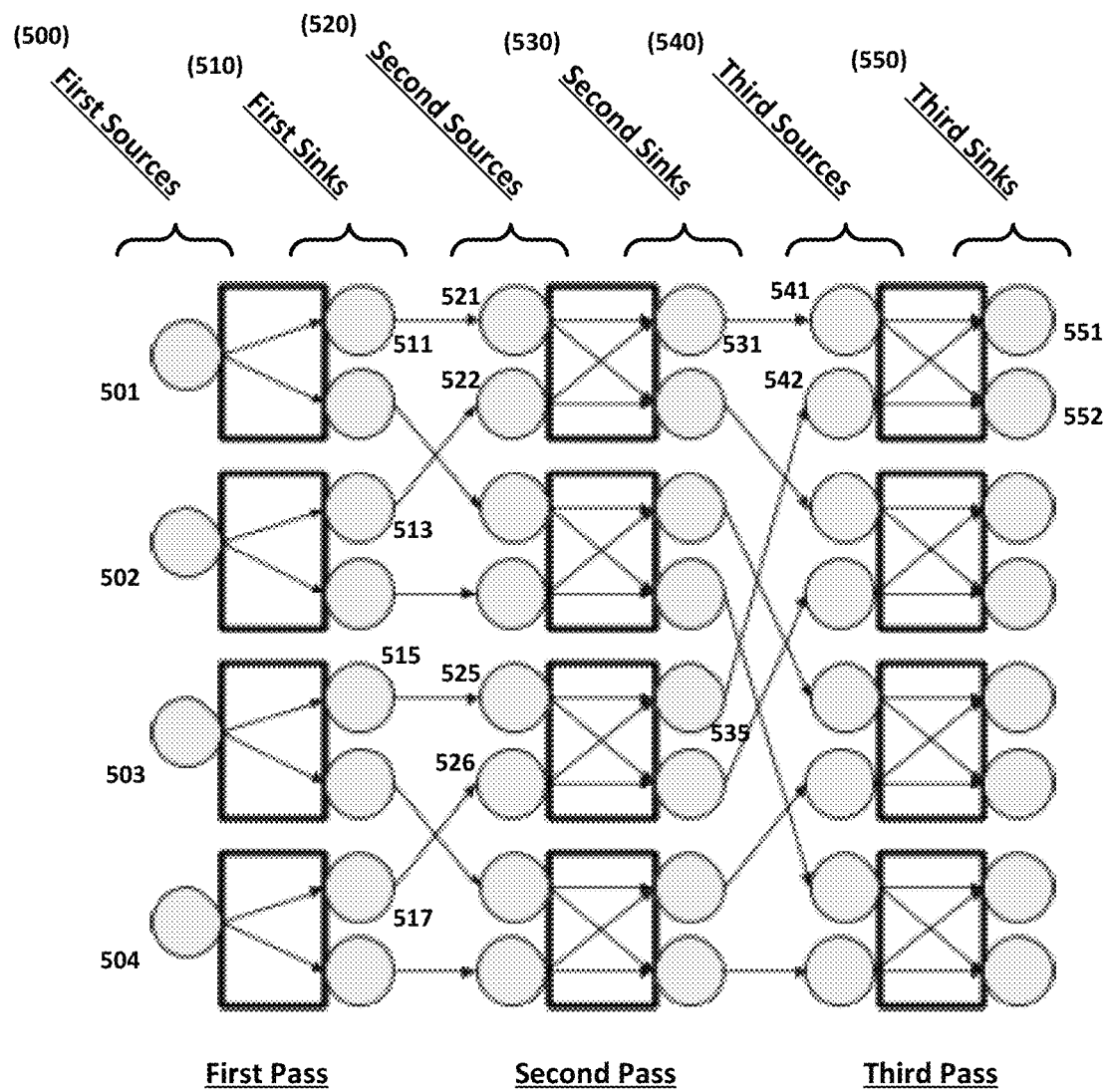

FIG. 5 shows an example of a "butterfly" shuffle distribution scheme. In a butterfly, a limited number of sources are paired to a limited number of sinks, and data from the sources is then shuffled among the paired sinks. Thus, all data is shuffled in each pass, but in separate chunks. Introducing multiple butterfly passes to the total operation allows for shuffled data from each separate chunk to be paired with data from other separately shuffled chunks.

In the example of FIG. 5, the shuffle operations include a first pass from first sources 500 to first sinks 510, a second pass from second sources 520 (which correspond to the first sinks 510) to second sinks 530, and a third pass from third sources 540 (which correspond to the second sinks 530) to third sinks 550. In the first pass, each of the first sinks 510 receives segments of data from one of the first sources 500. For instance, sink 511 receives data from source 501, sink 513 receives data from source 502, sink 515 receives data from source 503, and sink 517 receives data from source 504. In each subsequent pass, each sink of the pass receives segments of data from two sources that received segments from different sources in the prior pass. For example, in the second pass, second sink 531 receives data segments from each of second sources 521, which in the prior first pass received data from first source 501, and 522, which in the prior first pass received data from first source 502. Sink 535 receives data segments from each of second sources 525, which in the prior first pass received data from first source 503, and 526, which in the prior first pass received data from first source 504. For further example, in the third pass, each of third sinks 551 and 552 receive data segments from each of third sources 541, which in the prior second pass received data from second sources 521 and 522, and 542, which in the prior second pass received data from second sources 552 and 526.

Although the example of FIG. 5 shows only first, second and third passes are shown, one skilled in the art would readily understand that the operations may continue on with additional passes. In the example of FIG. 5, each pass is shown as having no more than eight sources and eight sinks, which is enough for each final sink 550 to include data segments from every one of the first sources 501, 502, 503 and 504. As the number of sources and sinks increases it may be necessary to add more passes to the butterfly shuffle, or to increase the complexity of each shuffle operation.

The use of a "butterfly" shuffle is particularly beneficial when data is distributed from a large number of sources. For example, to distribute data from 1,000,000 sources to 2,000,000 sinks in a single pass, each sink could be required to read data from numerous sources. For instance, if each sink were to read from 10,000 sources, the shuffle would require a total of 10,000*2,000,000=20 billion mappings between sources and sinks. Even if each sink were to read from only 1,000 sources, 2 billion mappings would still need to be tracked. Even if each sink were to read from only 8 sources, as in the example of FIG. 5, this arrangement would still require 16 million mappings to be tracked (eight mappings for each of the 2 million sinks). Introducing an initial split as a first pass within a multi-pass butterfly shuffle operation would allow the data to first be passed to the 2,000,000 sinks with a minimum number of mappings between sources and sinks, that is 2,000,000 mappings, or one source for each sink. Then in each subsequent pass, each sink may be mapped to two sources, resulting in a total of 4,000,000 mappings for the second pass, an additional 4,000,000 mappings for the third pass, and the same for any subsequent pass. In total, for the three passes shown in FIG. 5, the total number of mappings between sources and sinks that must be tracked add up to 10 million mappings, which is significantly less than the 10 billion or 1 billion mappings, and still less than the 16 million mappings, required in the example single-pass scenarios describes above, respectively. As such, the overhead in each pass of the shuffle operation may be significantly reduced: overhead of the first pass is reduced because it is a split; and overhead in the subsequent passes is reduced because each pass requires quadratically less overhead than a single pass shuffle between 1,000,000 sources and 1,000,000 sinks. Stated another way, although the total number of shuffles performed in each pass increases linearly, the total amount of processing for the shuffles collectively decreases quadratically.

In the above example of a sink split shown in FIG. 4, each pass is shown to include a single operation, instead of independently performed operations. In other examples, the number of operations performed in a single given pass of the multi-pass shuffle operation can be more than one. For instance, one skilled in the art would recognize that the individual butterfly shuffles shown in FIG. 5 could be executed independent of one another, thus resulting in multiple operations in each of the second and third passes.

Additionally, in the example of the butterfly shuffle in FIG. 5, the number of independent shuffles remains constant from one pass to the next. In other examples, the number of independent operations performed in each pass can change from one pass to the next.

Figure 6:
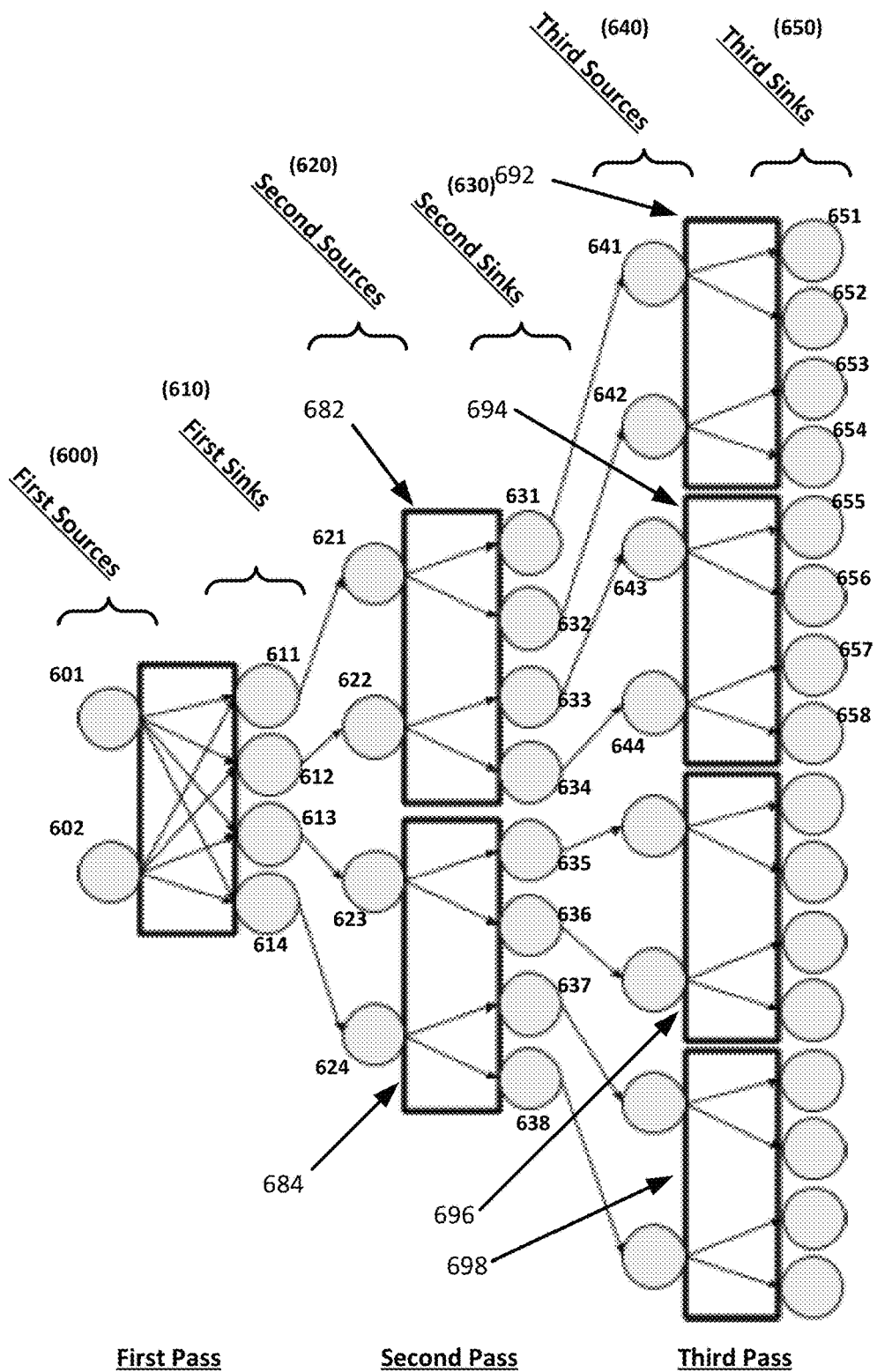

FIG. 6 shows an example of a "shuffle splitting" distribution scheme involving multiple sink splits, and in which the number of split operations performed in each passes increases from one pass to the next. In particular, in the example of FIG. 6, a first pass from first sources 600 to first sinks 610, for which the data of two sources 601 and 602 are shuffled among four sinks 611, 612, 613 and 614. In the second pass from second sources 620, which correspond to the first sinks 610, to second sinks 630, each source is split into two sinks. For example, the data of source 621 is split between sinks 631 and 632, the data of source 622 is split between sinks 633 and 634, the data of source 623 is split between sinks 635 and 636, and the data of source 624 is split between sinks 637 and 638. In the third pass from third sources 640, which correspond to the second sinks 630, to third sinks 650, each source is again split into two sinks. For example, the data of source 641 is split between sinks 651 and 652, the data of source 642 is split between sinks 653 and 654, the data of source 643 is split between sinks 655 and 656, and the data of source 644 is split between sinks 657 and 658.

Furthermore, the shuffle operations of the second pass are split or divided between two independently performed operations, such that the split of data in sources 621 and 622 is managed in a first operation 682, and the split of data in sources 623 and 624 is managed in a second separate operation 684. In a similar vein, the sinks of each given independent operation of the second pass are split between two separate operations of the third pass. For instance, the split of data in sources 641 and 642 is managed in a first operation 692, and the split of data in sources 643 and 644 is managed in a second separate operation 694. Similarly, the data that is split in operation 684 of the second pass in then divided between two separate split operations 696, 698 in the third pass.

In the example of FIG. 6, the number of split operations from one pass to the next increases by a factor of two. Hence the "splitting factor" of this shuffle split is said to be two. In other examples, the number of independent operations may increase by a factor greater than two, such as three, four, five, eight, ten, and so on.

Although the total number of mappings between sources and sinks may not be reduced by handling passes as multiple, separate operations, the use of separate operations does permit for the use of multiple shuffle logs for the same pass. This allows an overall size of each shuffle log to be maintained at a reduced size. As the number of sources and sinks increases and the amount of metadata to be tracked during shuffle operations increases, dividing the metadata into separate shuffle logs may be beneficial. For instance, and with further reference to FIG. 6, a processor controlling operations of the second pass from second sources 620 to second sinks 630, such as the one or more processors 210 shown in the example of FIG. 2B, may control operations 682 and 684 to be handled sequentially or simultaneously, thus improving control over the bandwidth and timing of the shuffle operations.

For example, an initial pass that shuffles data from 10,000 sources to 20,000 sinks may be followed a second pass having two independent shuffles of 10,000 sources to 20,000 sinks. The result of the second pass would distribute the data among 40,000 sinks, but the metadata of the data blocks moved in the second pass may be split between two separate shuffle logs. This may be especially helpful when a shuffle operation involves a number of sinks much greater than the number of sources, since data could be sufficiently shuffled in early passes of the operation before the number of sinks increases, and then split into a number of sinks according to independent operations managed by separate shuffle logs. In this manner, each shuffle log would contain metadata for only those sinks that read the blocks of its own operations, and not the blocks of the other, independent operations of the pass.

Additionally, if the operations are handled in parallel or at the same time, and if one operation is completed before the other operation, metadata from the shuffle log of the completed operation may be flushed without having to wait for the other, separate operation to also be completed. To illustrate if a shuffle log of a single "sink split" operation including 100,000 uniformly distributed sinks were to contain 50 GiB, then the flusher would flush on average about 0.5 MiB of data per sink completed. However, if the same shuffle log data were split among 100 separate "sink split" operations, each operation including 1,000 sinks, then the flusher would flush on average about 50 MiB of data per sink completed.

Figure 7:
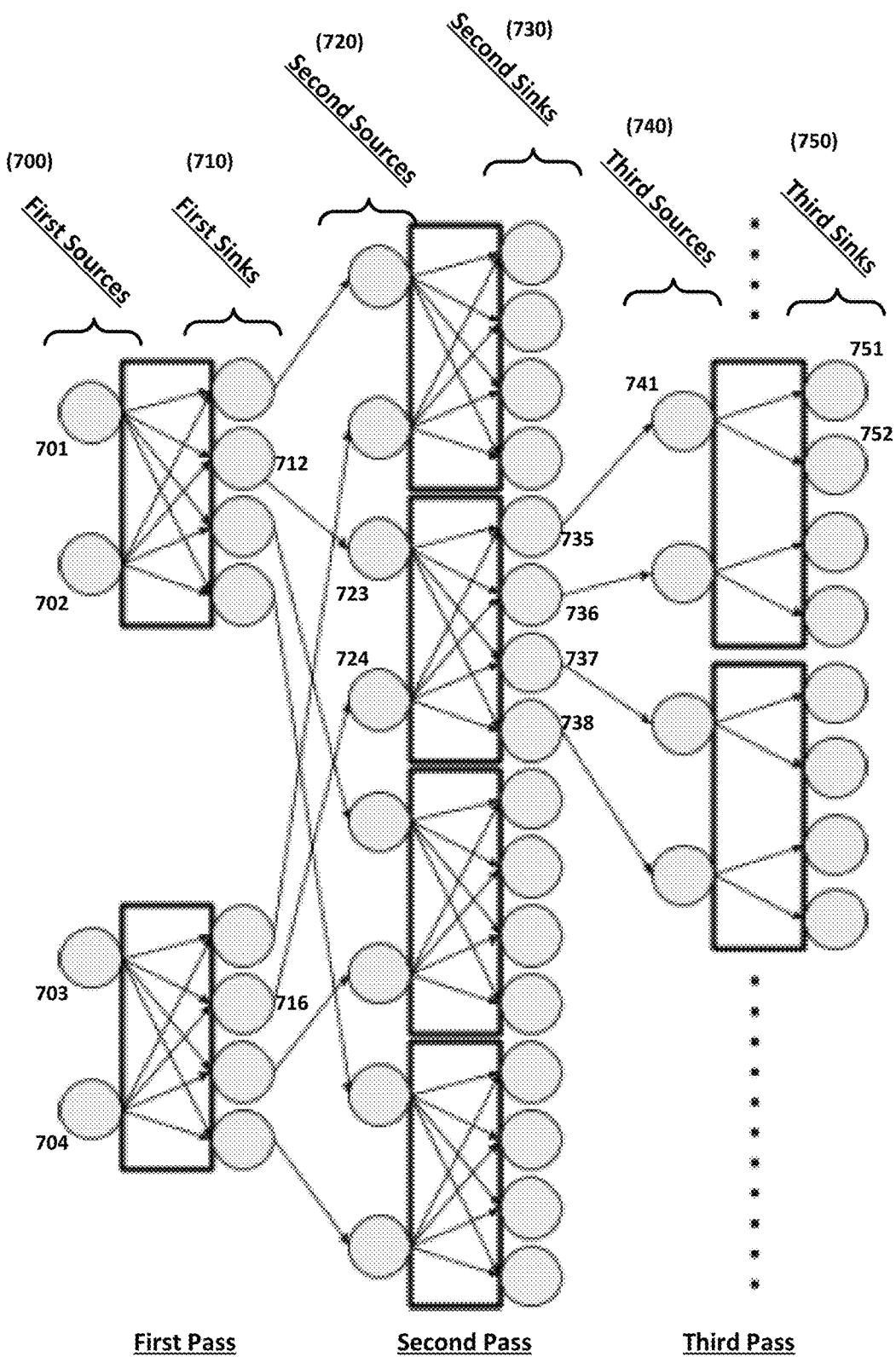

FIG. 7 shows an example data distribution scheme combining both concepts of the butterfly shuffle from FIG. 5 and shuffle splitting from FIG. 6. In the example of FIG. 7, a first pass in which data of first sources 700 is written to first sinks 710, a second pass in which data of the second sources 720, corresponding to first sinks 710, is written to second sinks 730, and a third pass in which data of the third sources 740, corresponding to second sinks 730, is written to third sinks 750.

In each pass, each sink may receive data from two sources. Furthermore, in each pass, the sinks may be broken into groups, whereby each group of sinks receives data from the same two sources. In this manner, shuffle operations for each group of sinks and their corresponding two sources may be handled as an independent operation having its own shuffle log limited to the metadata of the data written to the given group of sinks. For example, in the second pass, second sinks 735, 736, 737 and 738 may all receive data from second sources 723 and 724. The shuffle between sources 723 and 724 and sinks 735, 736, 737 and 738 may be managed independently in its own shuffle log containing metadata of only the data written to sinks 735, 736, 737 and 738.

In the example of FIG. 7, the number of independent operations performed from each pass to the next increases by a factor of 2. That is, the first pass involves two operations, the second pass involves four operations, and the third pass may involve eight operations (not shown in entirety).

In can also be seen from the example of FIG. 7 that each third sink 750 may receive data from every one of the first sources 700. For example, each of third sinks 751 may include the data of third source 741, which in turn corresponds to second sink 735. Second sink 735 may include data from each of the corresponding second sources 723 and 724, which correspond to first sinks 712 and 716, respectively. First sink 712 may include data from each of first sources 701 and 702, and first sink 716 may include data from each of first sources 703 and 704. Thus, data in third sinks 751 and 752 can be traced back to each of the first sources 700.

Stated another way, the example of FIG. 7 may be considered like a split shuffle in that the number of independent operations can multiply from one pass to the next, and may be considered like a butterfly shuffle in that the data of sinks drawing from different sources of a previous pass can be combined in a single operation of a subsequent pass. This can add a further layer of complexity and robustness to the shuffle operations in order to yield improved results for the queries applied to the collected data.

The above examples of FIGS. 4, 5, 6 and 7 demonstrate various types of passes and shuffle operations that may be performed in order to alleviate quota as the amount of data, sources, sinks, shuffles, or any combination thereof, increases. The one or more processors, such as processors 210 of FIG. 2B, may be programmed to track progress of the shuffle operations and to dynamically determine the types of passes to execute based on the tracked progress. Auto operators, or plan adapters, associated with various operations, such as "join" or "group shuffle," may dynamically decide whether to initiate a multi-pass shuffle, and if so, what types of operations to apply. For example, an auto join plan adapter may determine between initiating a "shuffle split" if the data is not yet distributed consistently to both sides of the join, or a "sink split" is the data has already been distributed consistently.

In some examples, shuffle splitting may be initiated by one or more processors, such as processors 210 of FIG. 2B, in response to the processors determining that a monitored value exceeds a predetermined threshold value. The monitored value may be a number of sinks utilized in a given pass, whereby the sinks are split into separate operations until the number of sinks in each operation is less than the threshold value. Alternatively or additionally, the monitored value may be a number of mappings between sources and sinks in a given pass, whereby the sinks are split into separate operations until the number of mappings between sources and sink in each separate operation is less than the threshold value.

The above examples demonstrate examples of multi-pass shuffle in which each pass is treated as a separate operation. In other examples, passes may be combined as a single shuffle operation while at the same time maintaining the benefits of reduced overhead and smaller metadata logs. Furthermore, the above examples treat the sinks of each pass as separate from one another. In other examples, there may be overlap between the sinks of each pass. For instance, in an example shuffle operation in which each pass writes to more sinks than the previous pass, the sinks of one pass may be a subset of the sinks of the next pass, and the sinks of the next pass may be a subset of the sinks of the subsequent pass, and so on.

For example, if data is shuffled from 100,000 sources to 100,000 sinks, and if 1,000 sinks are used in a first pass, the 1,000 sinks of the first pass may be 1,000 of the 100,000 sinks to be used in the second pass. In such a case, a partitioning scheme may be utilized to prevent the first sources from writing to any of the remaining 99,000 sinks that are not first sinks. One effect of such a partitioning scheme is that it transformed the multiple shuffle operations of the previous examples into essentially a single shuffle operation from one set of predesignated sources to one set of predesignated sinks.

Figure 8:
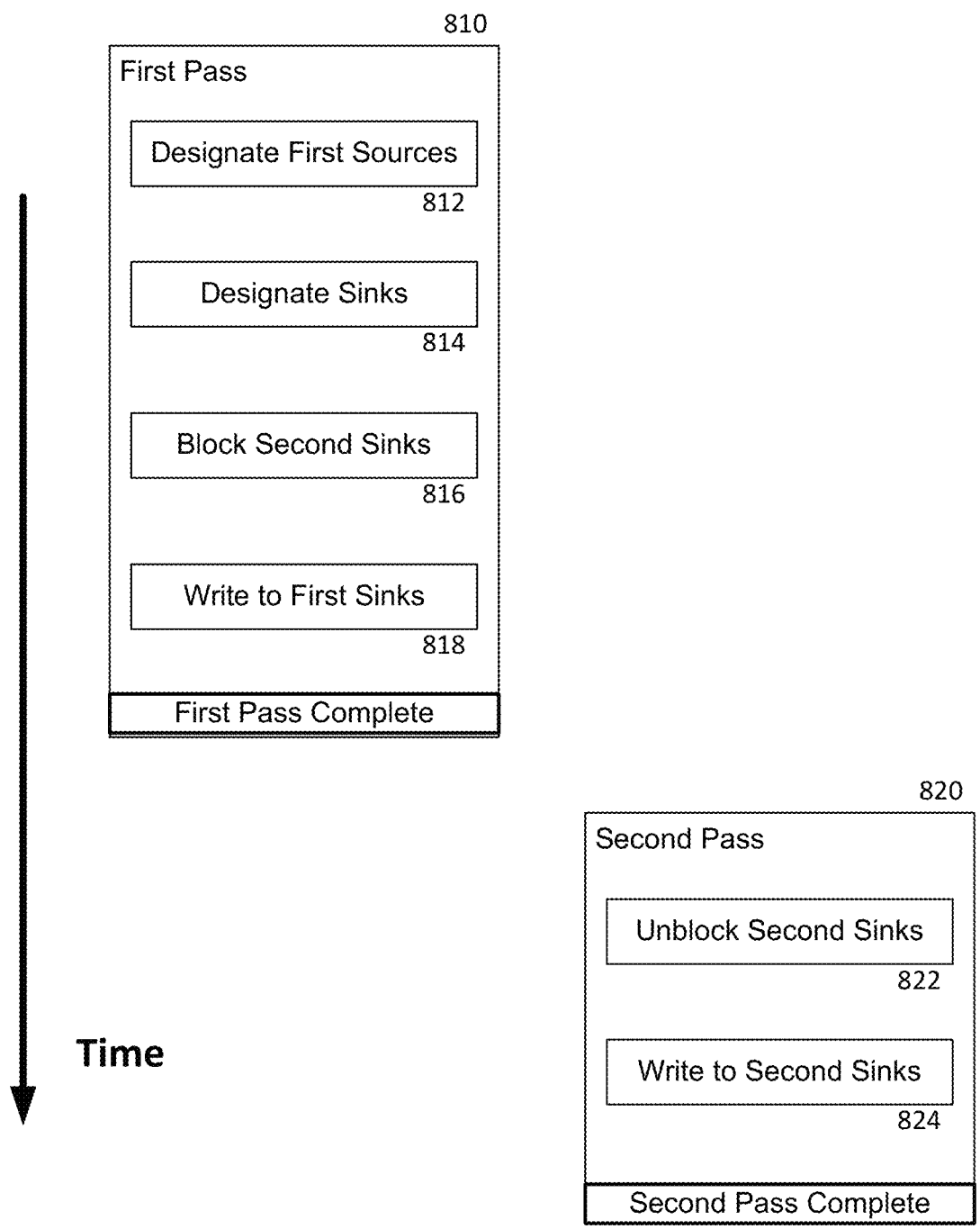
FIGS. 8 and 9 are block diagrams illustrating example workflows according to aspects of the disclosure.
Figure 9:
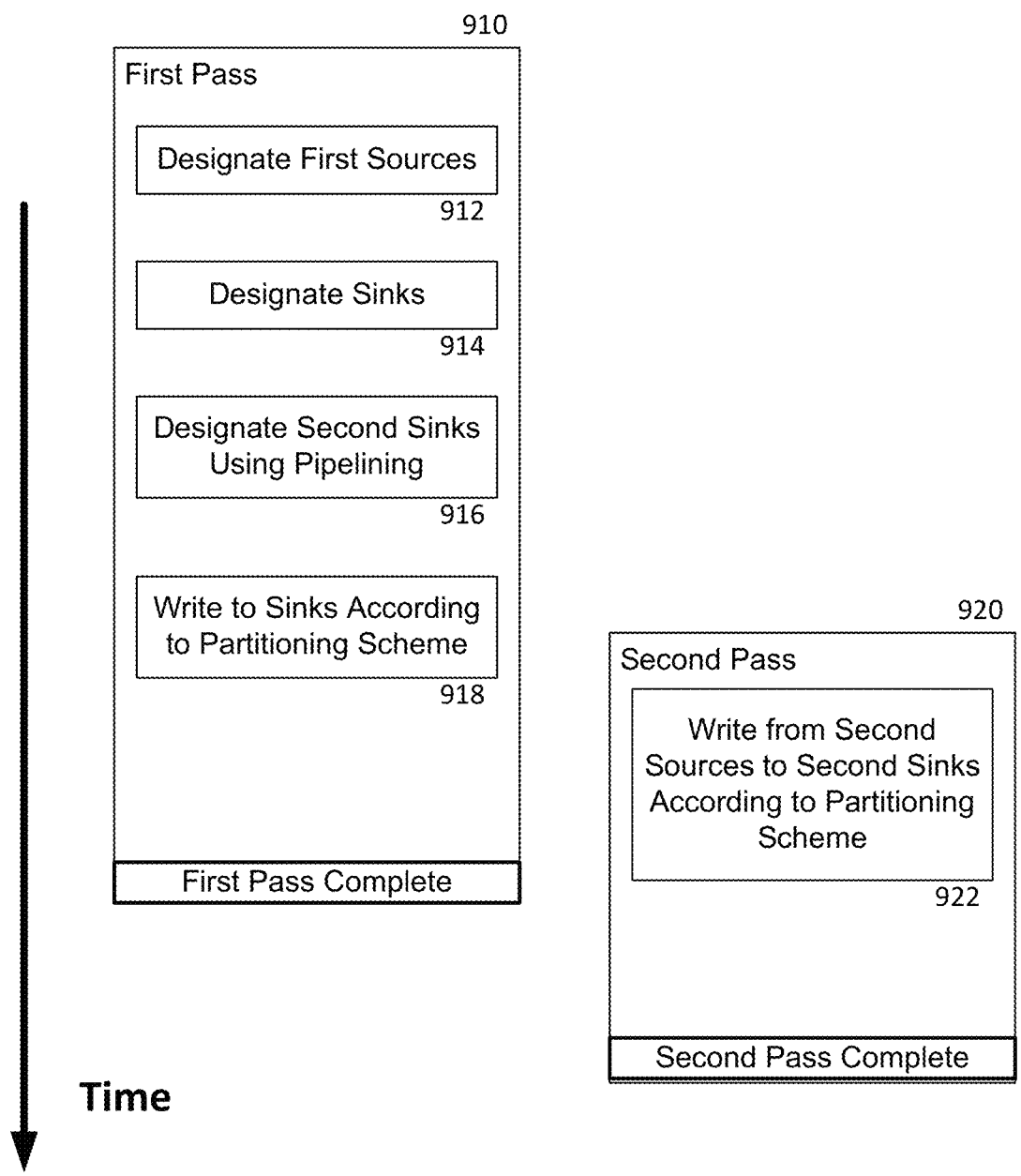

FIGS. 8 and 9 show example partitioning schemes that may be used to partition passes of such a single shuffle operation. The examples of FIGS. 8 and 9 are limited to first and second passes, but it should be understood that the schemes outlined therein could be repeated in a shuffle operation having more than two passes.

The example of FIG. 8 shows a "deferred partitioning" scheme, in which a first pass 810 is completed before a second pass 820 begins. The first pass 810 may involve one or more processors, such as the one or more processors 210 of FIG. 2B, designating a set of first sources (812) and a set of first sinks (814), and blocking a set of second sinks (816). While data is written from the set of first sources to the set of first sinks according to instructions from the one or more processors (818), the set of second sinks may remain blocked from receiving any of the shuffled data. This may ensure that all shuffled data in the first pass is written to the first sinks only, and not to the second sinks. When the first pass 810 is entirely complete, then the one or more processors may initiate operations of the second pass 820, whereby the set of second sinks may be unblocked (822), after which data from second sources (which may correspond to the first sinks) may be written to the set of second sinks (824). Once all of the data has been written to the set of second sinks, that the second pass is complete.

The alternative example of FIG. 9 shows a "pipelining deferred partitioning" scheme, in which a second pass 920 may begin before a preceding first pass 910 is completed. The first pass 910 may involve the one or more processors designating a set of first sources (812) a set of first sinks (814), and a set of second sinks (816) using pipelining. The pipelining may use a partitioning scheme whereby none of the first sources write to sinks that the first sinks with the deferred partitioning write to. The second pass 920 may begin when writing to any one of the first sinks is completed, even if writing to the other first sinks has not yet finished. In the second pass 920, the second sources corresponding to the finished first sinks may write data to second sinks according to the partitioning scheme (922). As writing operations to each first sink is completed, writing operations for another corresponding second source may begin, and this may continue until the entire second pass 920 is completed.

In some examples, initiation of a second pass of a multi-pass shuffle can be conditioned on the data having already been flushed from the shuffle log of the first shuffle. Such conditioning may ensure that the shuffle logs of the multi-pass shuffle do not take up unnecessary space, and may improve efficiency of the flushing operations. In other examples, the use of multiple passes to complete a shuffle operation may itself avoid the need for flushing metadata from the shuffle logs altogether, since reducing the total number of sink destinations for any given segment (as is accomplished in the multi-pass shuffle) would also reduce the total amount of metadata that needs to be stored for each segment.

In some examples, passes of the multi-pass shuffle operation may be pipelined. This may increase quota usage for the one or more processors, but with the advantage of improved performance. In such an example, shuffles occurring in earlier passes may be given higher priority, such as being given sufficient quota, so as to avoid a backlog in the pipelining. The one or more processors may receive instructions from a scheduler program in order to distribute quota among the pipelined shuffles and passes appropriately.

In some examples, a partitioning scheme of the multi-pass shuffle operations may repartition data to all available sinks in one pass, and then condense the data to a subset of the available sinks in a subsequent pass. Such a partitioning scheme may optimize reading of the sinks in the subsequent pass. In particular, if the sink addresses used are continuous, and if the shuffle log maps the subsets of available sinks to non-overlapping ranges of addresses, then lookup operations for the sinks of the subsequent pass may be as simple as a given range of addresses. As a result the mapping between sources and sinks may not take up any space, since sources that a sink is designated to read could be determined based on the sink's own address, without having to store a separate mapping between the sink and the sources addresses.

In the above described examples, each pass may use a hash partitioning function in order to direct data from the sources to their respective destination sinks. The hash partitioning function used in each pass may be correlated to the hash function of the previous pass. Similarly, in the case of "shuffle splitting," whereby separate shuffle operations are separately conducted in a single pass and split from a common shuffle operation of a previous pass, each of the separate shuffle operations may use a respective hash function that is correlated to the hash function of the previous pass.

The above described examples generally solve problems that arise when trying to run complex queries on volumes of data larger than about 10 TiB, such as tens of TiB of data. Such a volume of data generally requires the use of more than 10,000 sinks, which creates scaling difficulties for conventional single-pass shuffle operations. Those skilled in the art will recognize that the advantages of the multi-pass shuffle operations described herein are also application to smaller volumes of data. That is, even if those smaller volumes could be processed using conventional single-pass shuffle operations, the multi-pass shuffle operations described herein may be improve efficiency and reduce overall cost and overhead of the operations. In fact, some experimentation has suggested that the overall speedup for smaller input data volumes on the order of 1 TiB may be greater than the speedup for larger input data volumes on the order to 10 TiB.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of repartitioning data in a distributed network, the method comprising:
   executing, by one or more processors, a first pass of a data set from a plurality of first sources to a plurality of first sinks, each first sink collecting data from one or more of the first sources; and
   executing, by the one or more processors, a second pass of the data set from a plurality of second sources to a plurality of second sinks, each one of the plurality of first sinks corresponding to one of the plurality of second sources, and each second sink collecting data from one or more of the second sources,
   wherein executing the first and second passes causes the data set to be repartitioned such that one or more second sinks collect data that originated from two or more of the first sources.

2. The method of claim 1, wherein a quantity of the plurality of first sinks is greater than a quantity of the plurality of first sources.

3. The method of claim 2, wherein each first sink collects data from two or more of the first sources.

4. The method of claim 3, wherein a quantity of the plurality of second sinks is greater than a quantity of the plurality of second sources.

5. The method of claim 1, further comprising:
   executing N passes, N being a number having a value greater than two, wherein for each given pass, a plurality of sinks collect data from one or more of a plurality of sources, each source corresponding to a sink of a previous pass, wherein executing the N passes causes the data set to be repartitioned such that one or more Nth sinks collect data that originated from two or more of the first sources.

6. The method of claim 5, wherein for at least one pass of the N passes, each sink of the pass collects data from two or more of the sources of the pass, and wherein each of the two or more sources of the pass includes data that originated from different sources of an immediately preceding pass.

7. The method of claim 6, wherein for at least another pass of the N passes, each sink of the pass collects data from two or more of the sources of the pass, and wherein each of the two or more sources of the pass includes data that originated from different sources of an immediately preceding pass.

8. The method of claim 7, wherein the at least one pass and the at least another pass are consecutive passes of the N passes.

9. The method of claim 1, wherein each of the plurality of first sinks is a corresponding one of the plurality of second sources, and wherein the method further comprises:
   determining completion of the first pass; and
   initiating the second pass upon determining that first pass is completed.

10. The method of claim 1, wherein each of the plurality of first sinks is a corresponding one of the plurality of second sources, and wherein the method further comprises:
    prior to the first pass, designating each of the plurality of first sinks and the plurality of second sinks, whereby designation of the plurality of second sinks avoids data from the plurality of first sources being collected at the plurality of second sinks during the first pass; and
    upon at least one first sink completing collection from one or more of the first sources, and before completion of the first pass, designating one or more second sinks to collect from the at least one first sink.

11. The method of claim 1, wherein the data set is passed from the plurality of first sources to the plurality of first sinks using a first hash function, and from the plurality of second sources to the plurality of second sinks using a second hash function that is correlated to the first hash function.

12. The method of claim 1, wherein identifications of the plurality of second sinks are contiguous, and wherein for each second sink, the method comprising calculating a range of identifications of the second sources from which the second sink collects based on the identification of the second sink.

13. The method of claim 1, further comprising:
    flushing, by one or more processors, a shuffle log of the first pass.

14. The method of claim 13, wherein before completion of the flushing, executing the second pass for segments of the data set that have been flushed from the shuffle log of the first pass.

15. The method of claim 14, wherein each of the plurality of shuffles is executed in parallel by the one or more processors, and wherein data included in both the first and second data logs is flushed from the first and second portions of the second sources in parallel.

16. The method of claim 1, wherein executing the second pass comprises executing a plurality of shuffle operations, wherein a first portion of the second sources is included in a first data log, and a second portion of the second sources is included in the second data log.

17. A system for repartitioning data in a distributed network, the system comprising:
    one or more processors; and
    one or more storage devices in communication with the one or more processor, wherein the one or more storage devices contain instructions configured to cause the one or more processors to:
      execute a first pass of a data set from a plurality of first sources to a plurality of first sinks, wherein each first sink collects data from one or more of the first sources; and
      execute a second pass of the data set from a plurality of second sources to a plurality of second sinks, wherein each one of the plurality of first sinks corresponds to one of the plurality of second sources, and wherein each second sink collects data from one or more of the second sources,
      wherein the first and second passes cause the data set to be repartitioned such that one or more second sinks collect data that originated from two or more of the first sources.

18. The system of claim 17, wherein each first sink collects data from two or more of the first sources, and wherein a quantity of the plurality of second sinks is greater than a quantity of the plurality of second sources.

19. The system of claim 17, wherein the instructions are configured to cause the one or more processors to execute N passes, N being a number having a value greater than two, wherein for each given pass, a plurality of sinks collect data from one or more of a plurality of sources, each source corresponding to a sink of a previous pass, wherein executing the N passes causes the data set to be repartitioned such that one or more Nth sinks collect data that originated from two or more of the first sources.

20. The system of claim 19, wherein for at least one pass of the N passes:
    each sink of the pass collects data from two or more of the sources of the pass; and
    each of the two or more sources of the pass includes data that originated from different sources of an immediately preceding pass, wherein for at least one other pass of the N passes:
   each sink of the pass collects data from two or more of the sources of the other pass; and
   each of the two or more sources of the other pass includes data that originated from different sources of an immediately preceding pass, and
wherein the at least one pass and the at least one other pass are consecutive passes of the N passes.

* * * * *